(12) United States Patent
Crider et al.

(10) Patent No.: US 7,741,976 B2
(45) Date of Patent: Jun. 22, 2010

(54) SERVER AND METHOD FOR PROCESSING METER DATA INTO A COMMON FORMAT

(75) Inventors: Gary C. Crider, Arlington, TX (US); Carol Gomez, Grand Prairie, TX (US); John D. Nguyen, Fort Worth, TX (US); Paul E. Hake, DeSoto, TX (US); Kantol Khek, Moorestown, NJ (US)

(73) Assignee: Hunt Power, L.P., Dallas, TX (US)

( * ) Notice: Subject to any disclaimer, the term of this patent is extended or adjusted under 35 U.S.C. 154(b) by 1070 days.

(21) Appl. No.: 11/305,357

(22) Filed: Dec. 16, 2005

(65) Prior Publication Data
US 2007/0139219 A1    Jun. 21, 2007

(51) Int. Cl.
*G08B 23/00* (2006.01)

(52) U.S. Cl. .................. 340/870.02; 702/61; 702/62; 705/412; 370/401

(58) Field of Classification Search ............ 340/870.02–870.03; 702/61, 62; 705/412; 370/401
See application file for complete search history.

(56) References Cited

U.S. PATENT DOCUMENTS

| | | | |
|---|---|---|---|
| 4,504,831 A | 3/1985 | Jahr et al. | 340/870.03 |
| 4,749,992 A | 6/1988 | Fitzemeyer et al. | 340/870.02 |
| 4,804,957 A | 2/1989 | Selph et al. | 340/870.03 |
| 4,833,618 A | 5/1989 | Verma et al. | 364/483 |
| 5,252,967 A | 10/1993 | Brennan et al. | 340/870.02 |
| 5,452,343 A | 9/1995 | Garland et al. | 379/106 |
| 5,528,507 A | 6/1996 | McNamara et al. | 364/483 |
| 5,548,633 A | 8/1996 | Kujawa et al. | 379/93 |
| 5,808,558 A | 9/1998 | Meek et al. | 340/870.01 |
| 5,892,758 A | 4/1999 | Argyroudis | 370/335 |
| 5,914,672 A | 6/1999 | Glorioso et al. | 340/870.02 |
| 5,923,269 A | 7/1999 | Shuey et al. | 340/870.02 |
| 6,006,212 A * | 12/1999 | Schleich et al. | 705/412 |
| 6,069,571 A * | 5/2000 | Tell | 340/870.02 |
| 6,122,603 A | 9/2000 | Budike, Jr. | 702/182 |
| 6,150,955 A | 11/2000 | Tracy et al. | 340/870.02 |
| 6,163,602 A | 12/2000 | Hammond et al. | 379/114 |
| 6,195,018 B1 | 2/2001 | Ragle et al. | 340/870.01 |
| 6,246,677 B1 | 6/2001 | Nap et al. | 370/346 |
| 6,311,105 B1 | 10/2001 | Budike, Jr. | 700/291 |

(Continued)

FOREIGN PATENT DOCUMENTS

FR    2812961    8/2000

OTHER PUBLICATIONS

"MeterSmart Launches Remote Meter Reading via Satellite," 1 page, Sep. 20, 2004.

(Continued)

*Primary Examiner*—Albert K Wong
(74) *Attorney, Agent, or Firm*—Baker Botts L.L.P.

(57) ABSTRACT

A method for processing meter data into a common format includes receiving, in a first transmission, meter data using a satellite communications network in a common protocol, the meter data representing information read at time intervals from associated utility meters in at least two data formats, each data format associated with a type of utility meter. The meter data in the plurality of formats is processed into a common data format. The meter data is stored in the common format as interval data for transmission to a customer.

13 Claims, 4 Drawing Sheets

U.S. PATENT DOCUMENTS

| | | | |
|---|---|---|---|
| 6,333,975 B1 | 12/2001 | Brunn et al. | 379/106.03 |
| 6,393,341 B1 | 5/2002 | Lawrence et al. | 700/286 |
| 6,401,081 B1 | 6/2002 | Montgomery et al. | 705/63 |
| 6,424,270 B1 | 7/2002 | Ali | 340/870.02 |
| 6,452,505 B1 | 9/2002 | Taglioni | 340/870.02 |
| 6,657,552 B2 | 12/2003 | Belski et al. | 340/870.02 |
| 6,671,636 B2 | 12/2003 | Dawson | 702/62 |
| 6,747,981 B2 | 6/2004 | Ardalan et al. | 370/401 |
| 6,862,540 B1 | 3/2005 | Welch et al. | 702/44 |
| 6,885,309 B1 | 4/2005 | Van Heteren | 340/870.11 |
| 6,904,385 B1 | 6/2005 | Budike, Jr. | 702/182 |
| 7,239,250 B2 * | 7/2007 | Brian et al. | 340/870.02 |
| 7,304,587 B2 * | 12/2007 | Boaz | 340/870.02 |
| 2003/0076242 A1 | 4/2003 | Burns et al. | 340/870.02 |
| 2004/0004555 A1 | 1/2004 | Martin | 340/870.02 |
| 2004/0113810 A1 | 6/2004 | Mason, Jr. et al. | 340/870.02 |
| 2004/0263352 A1 | 12/2004 | Cornwall et al. | 340/870.02 |
| 2005/0033534 A1 | 2/2005 | Villicana et al. | 702/61 |
| 2005/0065742 A1 | 3/2005 | Rodgers | 702/62 |
| 2005/0068193 A1 | 3/2005 | Osterloh et al. | 340/870.02 |
| 2005/0086341 A1 | 4/2005 | Enga et al. | 709/224 |
| 2005/0116836 A1 | 6/2005 | Perry et al. | 340/870.02 |

OTHER PUBLICATIONS

News Release, "Itron Selects ORBCOMM for Satellite Communications for Commercial Gas Meters," Fort Lee, N.J. 2 pages, Dec. 6, 2005.

* cited by examiner

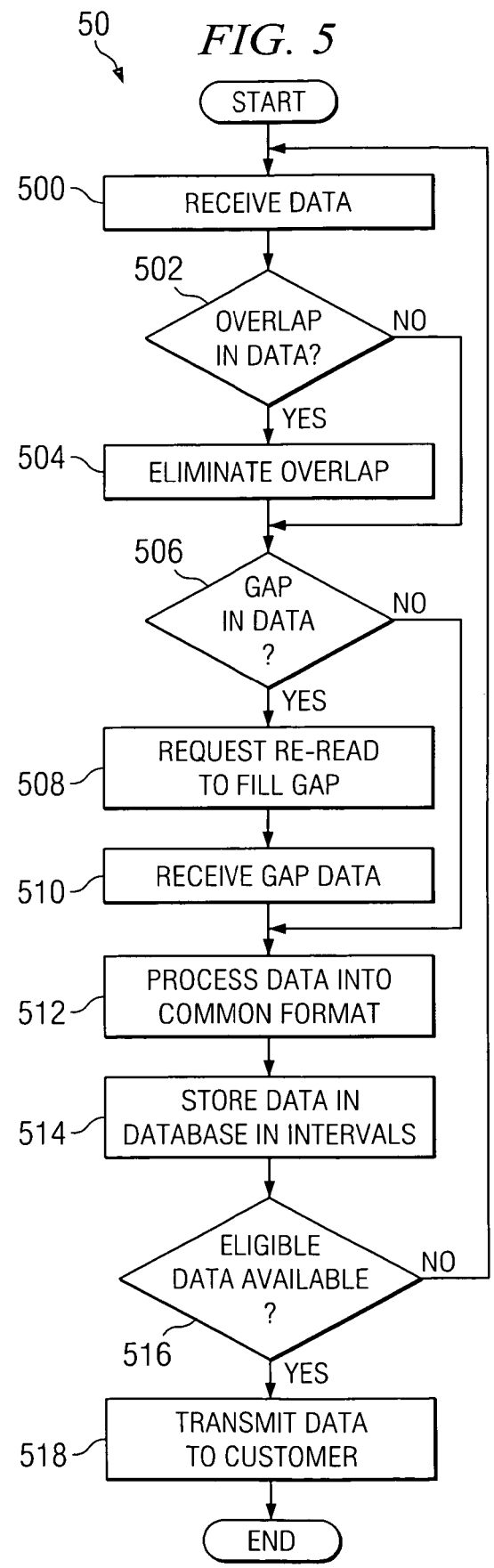

SERVER AND METHOD FOR PROCESSING METER DATA INTO A COMMON FORMAT

TECHNICAL FIELD OF THE INVENTION

This invention relates generally to the field of communications and more particularly, to a server and method for processing meter data into a common format.

BACKGROUND

Vendors provide meters to monitor and collect data, such as electrical-usage data, weather data, or environmental data. Each vendor provides a different type of meter to monitor and collect the data. The different types of meters use different protocols. Therefore, the data that is monitored, recorded, and collected from the different meters may not be consolidated and processed consistently.

SUMMARY OF THE DISCLOSURE

In accordance with the present invention, disadvantages and problems associated with consolidating and processing data from meters may be reduced or eliminated.

According to one embodiment of the present invention, a server and method for processing meter data into a common format includes receiving, in a first transmission, meter data using a satellite communications network in a common protocol, the meter data representing information read at time intervals from associated utility meters in at least two data formats, each data format associated with a type of utility meter. The meter data in the plurality of formats is processed into a common data format. The meter data is stored in the common format as interval data for transmission to a customer.

Certain embodiments of the invention may provide one or more technical advantages. A technical advantage of one embodiment includes a device and method that provides for converting data received from multiple vendors' meters in multiple protocols into a common protocol for processing. The common protocol provides for processing the data and presenting the data to the customer. Another technical advantage provides for processing the data to eliminate transmission errors, data retrieval errors, or other problems encountered while monitoring, collecting, and transmitting the data.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 5 is a flowchart for receiving and processing the meter data; and

DETAILED DESCRIPTION OF THE DRAWINGS

Embodiments of the present invention and its advantages are best understood by referring to FIGS. 1 through 6, like numerals being used for like and corresponding parts of the various drawings.

Figure 1:
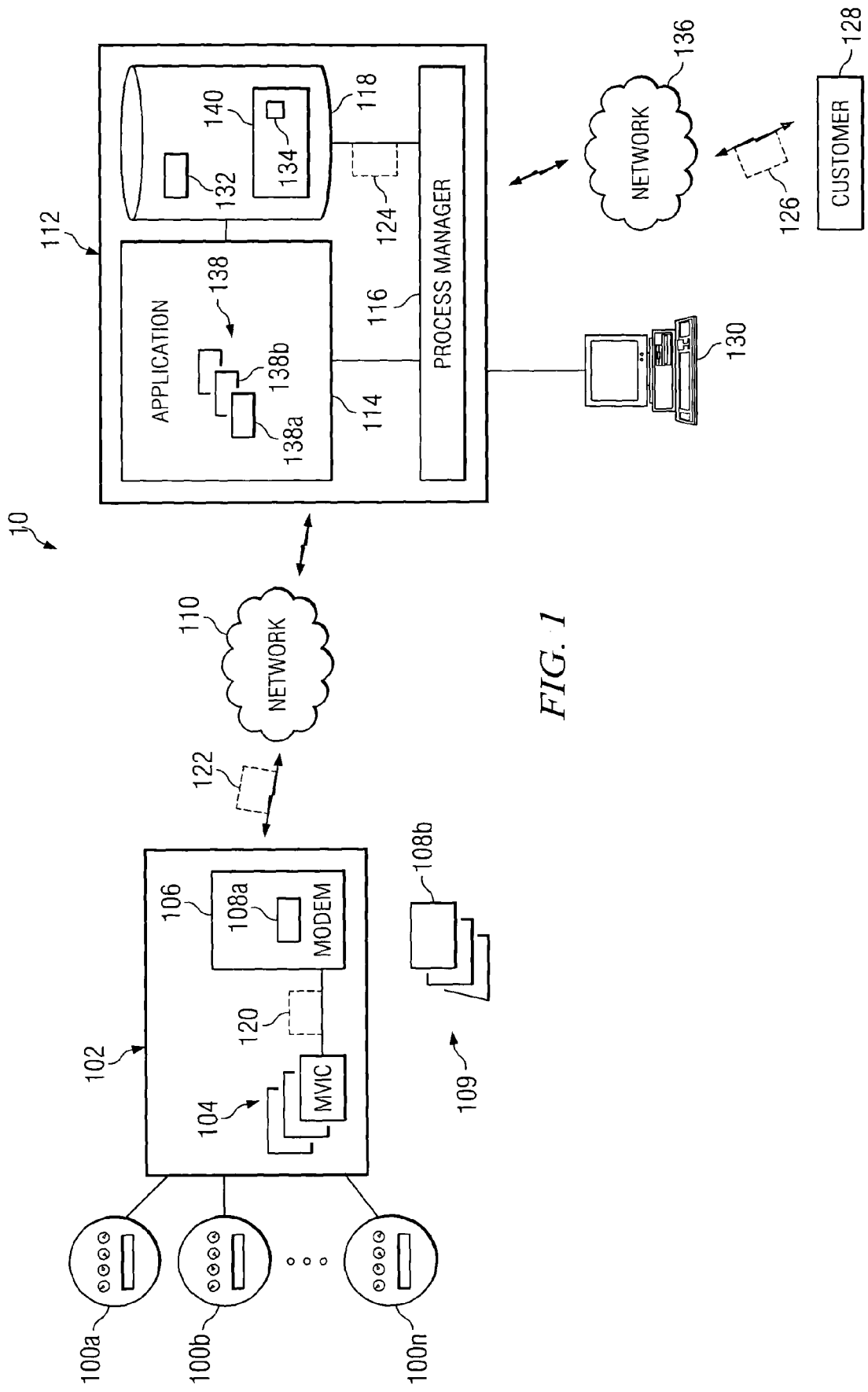
FIG. 1 illustrates a system for processing meter data.

FIG. 1 illustrates a system 10 for processing meter data from multiple meters. System 10 includes meters 100 that monitor and collect data and communicate that data to a device 102. Different meters 100 use different protocols to collect the data, so device 102 converts the data into a common protocol. In the common protocol, the data is communicated to a server 112 for further processing. Server 112 processes the data into a common format and provides the processed data to customer 128.

According to the illustrated embodiment, system 10 includes meters 100$a$, 100$b$, through 100$n$ that monitor and collect data. Meters 100 collect any suitable type of data representing information read at time intervals, such as electrical-usage data, gas-usage data, temperature, quality of air data, and environmental data. In an embodiment, meters 100 are utility meters. Meters 100 collect the data at any suitable, configurable interval. Meters 100 may be configured initially upon operation, configured after operation begins, and/or is configured remotely. Any suitable communication device may remotely configure meters 100 through network 110, such as a cellular phone or a computer.

Meters 100 monitor and collect the data using any suitable wireline or wireless protocol, such as Electronics Industry Association's (EIA's) Recommended Standard 232 (RS-232), EIA's Recommended Standard 485 (RS-485), the 802.11 family of wireless standards including, among others, 802.11a, 802.11b, and 802.11g, or a cellular protocol. Accordingly, system 10 includes meters 100 from different vendors that use different protocols to monitor and collect data. Meters 100 include power meters, gas stations, weather stations, or other suitable devices that gather data over time intervals. System 10 may include any suitable number of meters 100 from any suitable number of different vendors. Meters 100 communicate the collected data to a suitably located device 102. For example, meters 100 may be locally or remotely located to device 102. The location of meters 100 and device 102 provides for various communication links between meters 100 and device 102.

Device 102 converts the data collected by meters 100 into a common protocol, and communicates the data for further processing. Device 102 includes one or more multi-vendor interface components (MVIC) 104 and a modem 106. Device 102 may include other suitable components to facilitate conversion of the data into the common protocol and transmission of the data for further processing.

MVIC 104 interfaces with meters 100 and modem 106. MVIC 104 establishes a common hardware and/or software interface between meters 100 and device 102. MVIC 104 communicates with meters 100 using the particular protocol of each meter 100. Therefore, MVIC 104 receives data in different protocols from meters 100 before converting the data into a common protocol. For example, MVIC 104 receives RS-485 signals from meter 100$a$, and receives RS-232 signals from meter 100$b$. MVIC 104 converts the RS-485 signals into RS-232 signals. The RS-232 signals continue to modem 106 for processing and transmission. For the RS-232 signals that MVIC 104 receives, the conversion process is bypassed, and MVIC 104 forwards the RS-232 signals directly to modem 106 for processing and transmission. As another example, MVIC 104 receives an 802.11a signal from meter 100*a*, and receives an 802.11b signal from meter 100*b*. For the 802.11a signal, MVIC 104 converts the signal into an 802.11b signal. The 802.11b signal continues to modem 106 for processing and transmission. If MVIC 104 receives 802.11b signals, the conversion process is bypassed, and MVIC 104 forwards the 802.11b signals directly to modem 106 for processing and transmission. Meter data 120 represents the data from meters 100 in a common protocol. For example, RS-232 signals proceeding from MVIC 104 to modem 106 are data 120.

Modem 106 receives data 120 from MVIC 104 for communication to network 110. Before communicating data 120 to network 110, modem 106 packages data 120 into any suitable form for transmission. The packaged data is data 122. A suitable transmission form includes Satellite Data Transmission (SDT) form. SDT is used to encode raw data for transmission from modems 106 to network 110. Modem 106 includes any suitable bi-directional communication device that transmits and receives signals. In an embodiment, modem 106 communicates via a satellite link. Modem 106 communicates data 122 over network 110 at any suitable rate, at any suitable time, or at the occurrence of any suitable event. For example, modem 106 communicates data 122 upon receiving a request for data from server 112. Modem 106 may also compress and/or encode data 122 before transmission.

Software module 108 provides for packaging data 120 into data 122 and reporting data 122 to server 112. A module 108 is selected from a group of software modules 109 to use in packaging data 120. Module 108 is selected according to the type of data 120 MVIC 104 receives, the type of meter 100 collecting data, or any suitable information to select module 108. For example, each type of meter 100 may be associated with a module 108 within group 109. Module 108 selected from group 109 establishes a common software module for processing data that MVIC 104 receives. For example, the configuration of MVIC 104 corresponds to module 108 selected from group 109. As another example, selected module 108 corresponds to a particular MVIC 104 if device 102 includes a group of MVICs 104.

Module 108 reports data 122 periodically and/or on demand to server 112. Additionally, modules 108 may report data 122 at different times to regulate transmission loads. Selected module 108 and group of modules 109 each include any suitable software written in any suitable programming language. In an embodiment, module 108 includes an applet written in the Java™ programming language.

Networks 110 and 136 facilitate communication within system 10. For example, network 110 facilitates communication between device 102 and server 112 and network 136 facilitates communication between server 112 and customer 128. Networks 110 and 136 may be integrated or separate networks. Networks 110 and 136 include any suitable communication network, such as a satellite communications' network or a terrestrial communications' network. A communication network may comprise all or a portion of a public or private data network, a local area network (LAN), a wide area network (WAN), a local, regional, or global communication or computer network such as the Internet, a wireline or wireless network, an enterprise intranet, other suitable communication links, or any combination of the preceding. Networks 110 and 136 may include any combination of gateways, routers, hubs, switches, access points, base stations, satellites, server, and any other hardware, software, or a combination of the preceding that may implement any suitable protocol or communication.

Server 112 processes data 122 received from device 102. Server 112 includes an application 114, a process manager 116, and a staging database 118. Server 112 receives data 122 at any suitable time and at any suitable rate from device 102. In an embodiment, server 112 periodically interrogates network 110 to determine if data 122 is available for transmission. In another embodiment, application 114 reads database 118, which stores information from meters 100, to determine whether to request additional data 122 from device 102.

Server 112 receives data 122 and provides it to application 114. Application 114 arranges data 122 into a suitable condition for processing. For example, application 114 may download, decode, and/or decompress data 122. Application 114 includes any suitable application that can arrange data. In an embodiment, application 114 controls messages sent from server 112 to device 102 and determines whether data 122 includes a processing condition, such as a gap or redundant information. For example, if server 112 receives data 122 over a time interval and data is missing within the time interval, the data has a gap. Application 114 requests meter 100 be read again to obtain the data to fill the gap. As another example, application 114 determines whether data 122 includes information in a time interval that overlaps already received data 122. Application 114 removes the redundant information from data 122 and presents a single copy of data 122 for processing. As yet another example, application 114 receives data 122 that overlaps already processed data 122. Application 114 discards the overlapping data 122 and retains the processed data 122.

Application 114 receives data 122 in the format associated with the collecting meter 100. Even though device 102 puts the collected data into a common protocol, the data may remain in different formats. Therefore, data 122 needs to be put into a common format. In an embodiment, application 114 includes one or more software modules 138, each module 138 having a corresponding module 108 from group 109. Module 138 is selected to process the received data according to selected module 108 that processed the data in device 102. For example, module 138*a* corresponds to module 108*a* and module 138*b* corresponds to module 108*b*. In the illustrated embodiment, module 108*a* is selected to process data at device 102. Accordingly, application 114 selects module 138*a* to process data at server 112. In server 112, process manager 116 stages data 122 by processing data 122 and putting data 122 into a common format. Data 124 represents data 122 that is commonly-formatted.

Process manager 116 stores data 124 in database 118, and transmits data 124 to customer 128. Process manager 116 retrieves data 124 from database 118 and determines to whom data 124 belongs, the associated account, the associated meter 100, and/or any other suitable information. For transmission to customer 128, process manager 116 monitors database 118, extracts data 124 eligible for transmission, puts data 124 into a file for customer 128, and updates database 118 to reflect the current activity.

Database 118 stores data 124 for transmission to customer 128. Database 118 includes a header table 132, a staging table 140, and/or any other suitable table to store information. Database 118 stores data 124 as interval data 134 in staging table 140. In an embodiment, staging table 140 contains interval data 134 as a single, time-stamped row per interval with usage and status values for the interval. Header table 132 stores basic information about meter 100, information about the intervals stored in database 118, account number information, login information, information about the most recent export to customer 128, and/or other suitable information for transmission of data 124. For example, header table 132 contains a single row of data for each meter 100 that is received in a header portion of the data. As another example, header table 132 includes the interval frequency, the class of meter 100, or information for grouping meters 100 together during export processing.

Interval data 134 represents the actual usage per interval associated with customer 128. The interval that interval data 134 covers represents any suitable interval that corresponds to the collection interval from meter 100, any suitable interval that corresponds to the receipt of data 122 from device 102, or other suitable interval. Database 118 stores interval data 134 for each meter 100 and retains interval data 134 for any suitable number of days. For example, database 118 retains interval data 134 for a period of days and discards interval data 134 following the thirty-day period. Interval data 134 within database 118 may be transferred to customer 128 according to the availability of interval data 134 in server 112, according to a configured cycle that queries database 118 for undelivered interval data 134, or according to eligible interval data 134. Eligible interval data 134 includes previously undelivered data, data without a processing condition, or data specifically requested by customer 128 or administrator 130. In an embodiment, administrator 130 forces transmission of interval data 134 to customer 128 even if server 112 cannot retrieve data to fill the gap.

Customer 128 represents an entity, such as a person, a group of persons, and/or any appropriate hardware and controlling logic, capable of requesting and/or receiving customer data 126 from server 112. Data 126 represents interval data 134 prepared in a manner suitable for customer 128. In an embodiment, customer 128 includes Web browsers capable of accessing a computerized Web page to transmit and receive information using network 136. Customer 128 may include telephony equipment, computers, or any other appropriate device able to communicate with server 112 using network 136. For example, customer 128 transmits usage data requests to server 112 using network 136. As another example, customer 128 directly configures meter 100.

Administrator 130 configures elements within system 10, such as device 102 and server 112, and controls the operation of system 10. For example, administrator 130 configures meters 100 to report data 120 to device 102 at certain intervals, configures server 112 to report data 126 to customer 128, or any suitable operation of system 10. As another example, administrator 130 establishes new accounts for customers 128 and requests reading from meters 100. As yet another example, administrator 130 provides configuration settings and requests data on-demand from meters 100 and/or device 102. Administrator 130 sends and receives data signals in any suitable protocol. Administrator 130 represents an entity, such as a person, a group of persons, and/or any appropriate hardware and controlling logic, capable of configuring and controlling system 10. Administrator 130 may include computers, telephony equipment, or any other appropriate hardware and/or software able to communicate within system 10 to meters 100, device 102, server 112, and/or customer 128.

In an exemplary embodiment of operation, meters 100 gather meter data using different protocols. To prepare system 10 to gather meter data, meters 100, device 102, server 112, and/or other suitable elements are configured. For example, if system 10 gathers data from meter 100a, administrator 130 configures MVIC 104 to receive the data from meter 100a, configures modem 106 to process data from meter 100a using module 108a, and configures server 112 to process data from meter 100a using module 138a. Any suitable entity may configure the elements, such as administrator 130, customer 128, or any suitable hardware and/or software in the elements that provides for self-configuration. Furthermore, the configuration may occur locally or remotely. Meters 100 provide the readings in the different protocols to device 102. MVIC 104 accepts the readings in different protocols, converts the readings into a common protocol, and transmits data 120 to modem 106. Modem 106 loads module 108 associated with meter 100 from group of modules 109. Module 108 packages data 120 into a transmission format as data 122 for transmittal over network 110 to server 112.

Application 114, within server 112, prepares data 122 for processing, and provides data 122 to process manager 116. Process manager 116 formats data 122 into a common format resulting in data 124. Data 124 is stored in database 118 as interval data 134 in header table 132. Interval data 134 is communicated to customer 128 as data 126. Device 102 continues to receive data from meters 100, server 112 continues to receive data from device 102, and customer 128 continues to receive data from server 112.

System 10 contemplates various modifications, additions, or omissions. For example, server 112 may remotely reprogram meters 100, server 112 may remotely reprogram selected module 108, group of modules 109, or a combination of the preceding, or customer 128 may remotely configure meters 100, device 102, and/or server 112. In configuring system 10 for operation, a remotely located customer 128 configures meters 100, device 102, and server 112. As another example, customer 128 receives messages from meter 100 through any suitable form of communication. Customer 128 may receive administrative messages, error messages, or other suitable information from meter 100, modem 106, or module 108 through electronic mail. As yet another example of a modification, process manager 116 logs all messages and other activity throughout the process to help with troubleshooting, gathering statistics, gathering billing information, or gathering other suitable information through ad-hoc queries. Any suitable logic comprising software, hardware, other logic, or any suitable combination of the preceding may perform the functions of any components in system 10.

Figure 2:
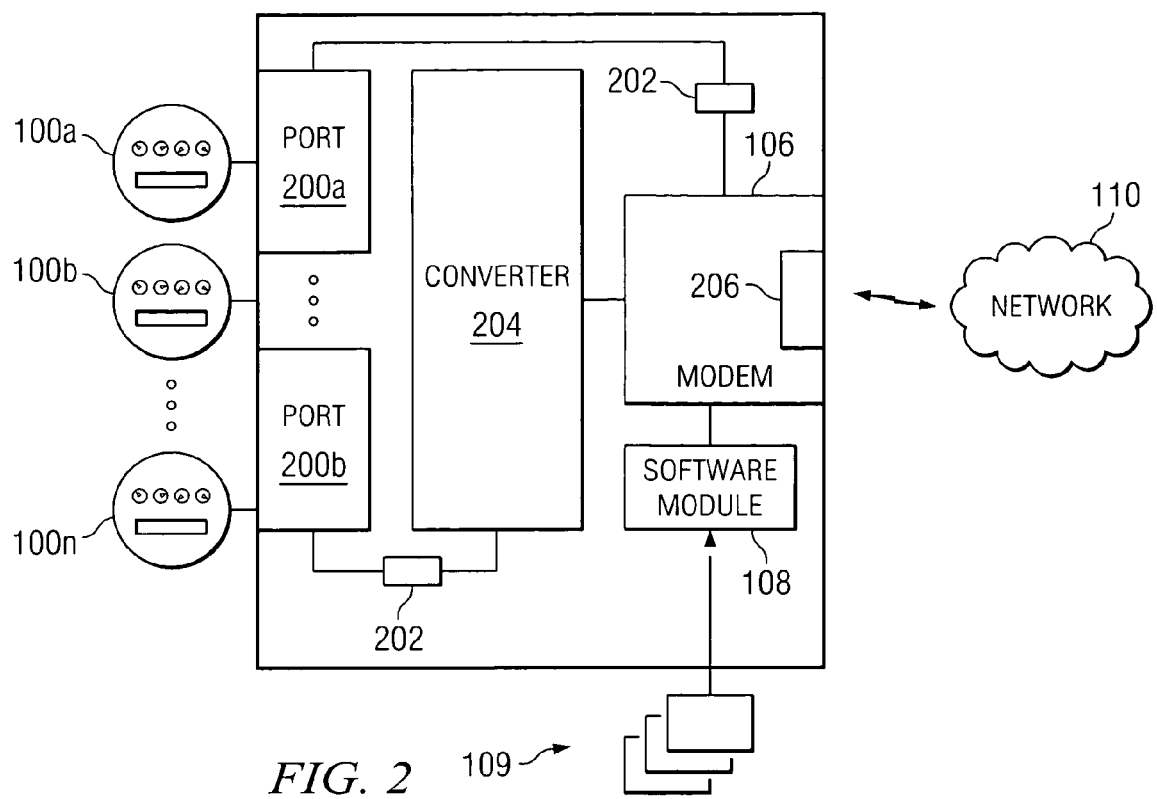
FIG. 2 is a block diagram illustrating functional components of a device that processes the meter data.

FIG. 2 is a block diagram illustrating functional components of a device 102 that processes the meter data. In general, device 102 communicates with meters 100 to receive data and communicates the data through network 110. More specifically, device 102 receives data from various meters 100, converts the data into a common protocol, and packages data into a transmission format. In the illustrated embodiment, device 102 includes MVIC 104, modem 106, and module 108.

In the illustrated embodiment, MVIC 104 includes communication ports 200, settings 202, and a converter 204. Ports 200 receive the data from meters 100. Ports 200 communicate with different meters 100 that use different protocols. For example, port 200a receives RS-232 signals, while port 200b receives RS-485 signals. Ports 200 include any suitable interface between meters 100 and device 102. In an embodiment, ports 200 are a physical interface, an electrical interface, a logical interface, channels, or other suitable interface that accommodate either digital or analog signals. Ports 200 include any suitable configuration of hardware, software, or other logic to implement communication with different meters 100 using different protocols.

Settings 202 provide for MVIC 104 receiving signals in different protocols. Settings 202 are configured for MVIC 104 to receive signals in different protocols. Settings 202 may be manually or remotely configured. For example, if MVIC 104 is configured to accept RS-485 signals but RS-232 signals arrive, settings 202 adjust to allow MVIC 104 to receive the RS-232 signals. Settings 202 include any suitable configuration of hardware, software, or other logic, such as a glue logic implementation or jumper implementation, to configure MVIC 104 to receive signals in different protocols. In an embodiment, MVIC 104 includes other settings 202 to support protocols in addition to RS-232 and RS-485, or other meters 100 having different pin-out characteristics.

Converter 204 converts data in different protocols into a single common protocol. For example, converter 204 converts signals received in RS-485 to RS-232. Accordingly, RS-232 signals are maintained as RS-232 signals. Converter 204 does not convert signals received in the common protocol. Converter 204 includes any suitable configuration of hardware, software, or other logic to convert data signals into the common protocol.

Interface 206 transmits and receives data from network 110. Interface 206 communicates using any suitable protocol for wireline or wireless communication. For example, interface 206 includes an antenna representing a radio frequency interface.

In an exemplary embodiment of operation, device 102 receives data from meter 100 at port 200. Port 200 that corresponds to the protocol receives the usage data. For example, port 200a receives RS-232 signals and port 200b receives RS-485 signals. Settings 202 are implemented as jumpers, which configure device 102 to convert the received signals, if necessary, and transmit the signals to converter 204. Converter 204 converts the signals into a common protocol. Modem 106 packages data 120 into a suitable transmission format as data 122 using software module 108. Module 108 is selected from group of modules 109 to format data 120 into the transmission format. Selected module 108 corresponds to meter 100 that transmits the meter data. Modem 106 communicates data 122 to network 110.

Modifications, additions, or omissions may be made to device 102. For example, device 102 includes a power component that provides power for device 102. As another example, device 102 includes a component to facilitate communication with network 110, such as an antenna. As yet another example, device 102 includes a satellite in view component that determines when a satellite is in view to communicate data 122. Additionally, any suitable logic, comprising software, hardware, other logic, or any suitable combination of the preceding may perform the functions of device 102.

Figure 3:
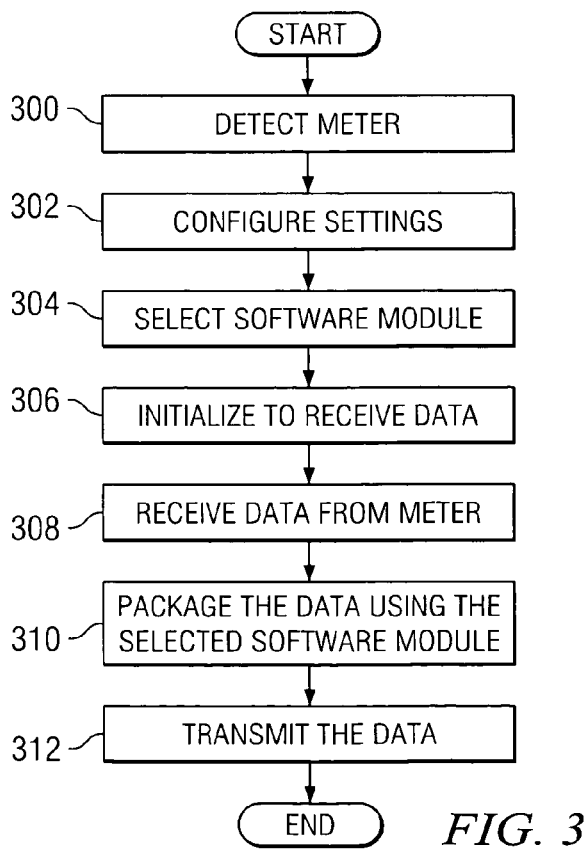
FIG. 3 is a flowchart for receiving the meter data.

FIG. 3 is a flowchart 30 for receiving the meter data from the multiple meters 100. Meters 100 are detected at step 300. Any suitable element within system 10 may detect meters 100, such as device 102, administrator 130, or customer 128. Meters 100 may be detected automatically or by an element initiating the detection. At step 302, the settings for the operation of system 10 are configured. For example, MVIC 104 is configured to receive the data from meter 100 and meter 100 is configured to provide the data at a suitable interval. At step 304, software module 108 and software module 138 that correspond to the detected meter 100 are selected. System 10 initializes meters 100, device 102, and server 112 for operation at step 306. Device 102 receives data 120 from meter 100 at step 308. The received data is packaged at step 310 according to selected module 108. Data 120 is packaged into a suitable form for transmission over network 110. Modem 106 transmits data 122 at step 312. The processing continues at server 112.

Modifications, additions, or omissions may be made to flowchart 30. For example, any suitable component may perform any or all of the steps performed by device 102. Although described in a particular sequence, flowchart 30 may perform steps serially or in parallel in any order.

Figure 4:
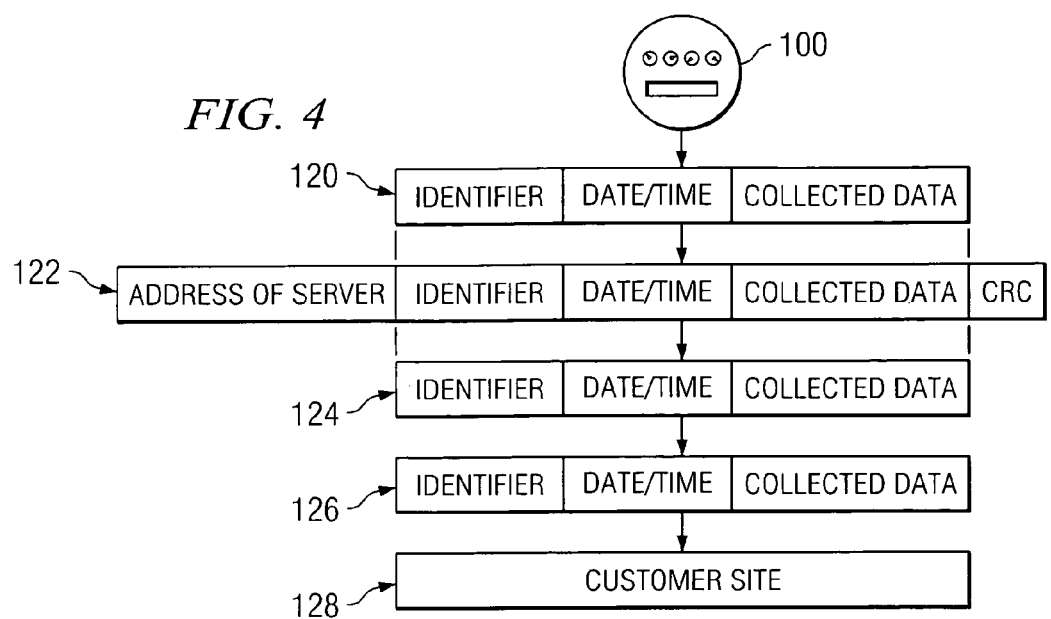
FIG. 4 is a diagram illustrating the meter data in various stages through the system.

FIG. 4 is a diagram illustrating the meter data in various stages through system 10. Meter 100 collects data over a time interval in the form of meter data 120. Data 120 includes the serial number or other identifier of meter 100, the date of collection, the time of collection, the collected data, and any other suitable information. As described above, data 120 is packaged into data 122 at device 102. Data 122 has a form suitable for communication through network 110. For transmission, data 122 may include the address of server 112, the identifier of meter 100, the date and time of collection, the collected data, and a cyclic redundant check, which checks the integrity of data 122. In an embodiment, data 122 is in SDT form.

When server 112 receives data 122, process manager 116 processes data 122 to arrive at data 124. Data 124 represents the varied data 120 in a common format. For example, data 124 includes an identifier of meter 100, the date and time of collection, and the collected data. Data 124 may be in any suitable format that is designed to have data from multiple meters 100 included in the same file. For example, data 124 includes interval data 134, which represents data collected from meter 100 over an interval. Database 118 stores data 124 until transmitted to customer 128 as data 126.

Data 126 presents the data received from meter 100 in a form appropriate for customer 128. Data 126 may include the identifier of meter 100, the date and time of collection, and the collected data. The format of data 126 depends on the needs of customer 128 and may be configured differently to meet the needs of customer 128. For example, data 126 has a first format for a customer 128, while data 126 has a second format for another customer 128, each format meeting the specific needs of each customer 128. In an embodiment, data 126 includes such information as the identification of meter 100, the interval time data 126 represents, and the consumption value for the interval. In another embodiment, data 126 is in a hand-held file (HHF) format that includes a header record, a termination record, status information, and other suitable information and records.

Modifications, additions, or omissions may be made to the data structures throughout system 10. For example, data 124 may include pulse data records, pulse data termination records, event data records, and event data termination records.

FIG. 5 is a flowchart 50 for receiving and processing the meter data. Server 112 receives data 122 from network 110 at step 500. Upon receiving data 122, application 114 places data 122 into a suitable form for processing. Server 112 determines whether data 122 has an overlap at step 502. An overlap exists when packaged data 122 includes data that server 112 has previously received. The overlap may include data over a time interval that is equivalent to the data over the time interval previously received by server 112. However, the overlap may include data over a time interval that does not correspond to the data over the same time interval that server 112 previously received. For example, a malfunction in system 10, a transmission error, or an operational error may cause the data received by server 112 to be different. If the data over the time interval does not correspond to the previously received data, server 112 applies any suitable logic to maintain a single version of the data. For example, server 112 may discard the most recently received data, server 112 may discard the oldest received data, or server 112 may discard both sets of data and request a re-read of the interval of data. In the illustrated embodiment, if an overlap exists in data 122, server 112 eliminates the overlap at step 504.

If the overlap does not exist or when the overlap is eliminated, server 112 determines whether data 122 has a gap at step 506. A gap occurs when server 112 does not receive all of the data over an interval. If data 122 has a gap, server 112 requests a re-read to fill the gap at step 508. Server 112 receives the data to fill in the gap at step 510.

When the gaps and overlaps have been eliminated, process manager 116 processes data 122 into commonly-formatted data 124 at step 512. Data 124 is stored in database 118 at step 514. Database 118 stores data 124 as interval data 134 in header table 132. At step 516, server 112 determines whether there is eligible data available for transmission to customer 128. As described above, eligible data includes data specifically requested by customer 128, data without processing conditions, data scheduled to be transmitted to customer 128, or any other suitable criteria that causes data to become eligible for transmission to customer 128. If eligible data is not available, server 112 continues to receive data 122. If eligible data is available, server 112 transmits data 124 at step 518 to customer 128 as data 126.

Modifications, additions, or omissions may be made to flowchart 50. For example, any suitable component may perform any and or all the steps performed by server 112. As another example, server 112 may not receive the requested gap information from a re-read. In this case, server 112 continues processing data 122 with the gap, stores data 124 with the gap in database 112, and transmits data 126 with the gap to customer 128. As yet another example, server 112 discards data 124 stored in database 118 after a configurable amount of time. As another example, server 112 performs a verification technique to determine whether the overlapping data is equivalent to the previously received data or different from the previously received data. Server 112 may also apply logic to handle the overlapping data. Although described in a particular sequence, flowchart 50 may perform steps serially or in parallel in any order.

Figure 6:
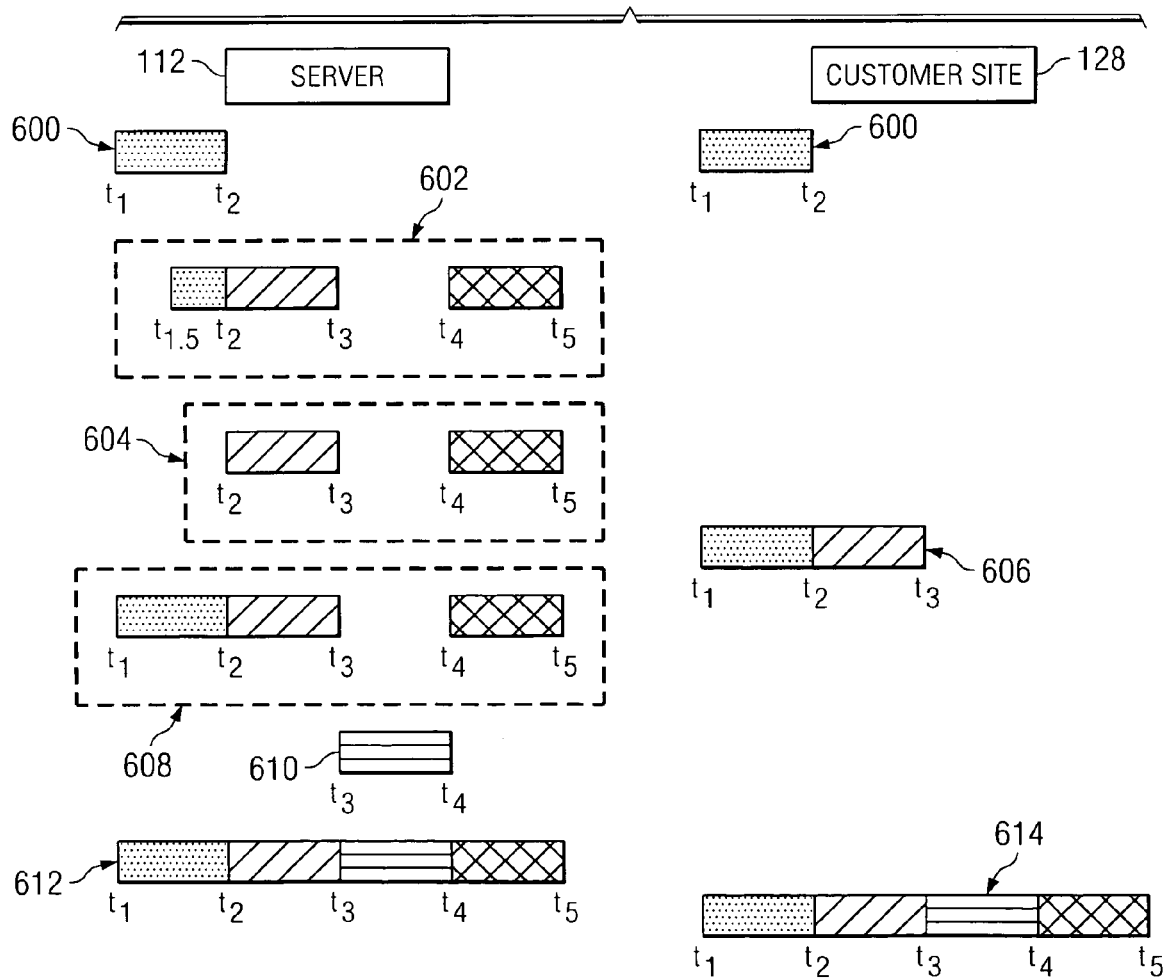
FIG. 6 is a diagram illustrating the server processing the meter data and transmitting the meter data to a customer.

FIG. 6 is a diagram illustrating server 112 processing the meter data and transmitting the meter data to customer 128. The illustrated embodiment includes storing data within server 112 before transmittal to customer 128. At 600, server 112 and customer 128 each have the same interval of data from $t_1$ to $t_2$ based on prior data reporting events. Server 112 receives additional data at 602. The data includes an overlap of data from $t_{1.5}$ to $t_2$, new data from $t_2$ to $t_3$ and $t_4$ to $t_5$, and a gap from $t_3$ to $t_4$. The overlap may include data over a time interval that is equivalent to the data over the time interval previously received by server 112. However, the overlap may include data over a time interval that does not correspond to the data over the same time interval that server 112 previously received. For example, a malfunction in system 10, a transmission error, or an operational error may cause the data received by server 112 to be different. If the data over the time interval does not correspond to the previously received data, server 112 applies any suitable logic to maintain a single version of the data. For example, server 112 may discard the most recently received data, server 112 may discard the oldest received data, or server 112 may discard both sets of data and request a re-read of the interval of data. In the illustrated embodiment, server 112 discards the overlapped data between $t_{1.5}$ and $t_2$ at step 604, and the data from $t_2$ to $t_3$ and $t_4$ to $t_5$ remains in server 112.

In the illustrated embodiment, server 112 transmits the eligible data that does not have gaps and is contiguous with data already at customer 128, which is the data from $t_2$ to $t_3$, to customer 128 at 606. As described above, eligible data includes data specifically requested by customer 128, data without processing conditions, data scheduled to be transmitted to customer 128, or any other suitable criteria that causes data to become eligible for transmission to customer 128. The data from $t_4$ to $t_5$ is not eligible for transfer yet because the gap from $t_3$ to $t_4$ remains. In an embodiment, server 112 may not transmit the data from $t_2$ to $t_3$ until the gap from $t_3$ to $t_4$ is filled.

At 610, server 112 receives the data to fill the gap. The complete interval of data from $t_1$ to $t_5$ exists in server 112 at 612. Server 112 transmits data from $t_3$ to $t_5$ to customer 128. At 614, customer 128 has data from $t_1$ to $t_5$ without any overlaps or gaps.

Modifications, additions, or omissions may be made to the diagram. For example, server 112 may handle overlaps and gaps in any suitable order. As another example, the transmittal of data from server 112 to customer 128, removal of overlapping data, and retrieval of gapped data may occur serially or in parallel in any order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for processing meter data into a common format, comprising:
   receiving, in a first transmission, meter data using a satellite communications network in a common protocol, the meter data representing information read at time intervals from associated utility meters in at least two data formats, each data format associated with a type of utility meter;
   processing the meter data in the plurality of formats into a common data format; and
   storing the meter data in the common format as interval data for transmission to a customer;
   comparing a first time interval of the received data to a second time interval of previously stored data from a particular meter;
   if at least a portion of the first time interval and the second time interval overlap, determining an overlap of data;
   discarding a selected portion of the received data or the stored data to remove the overlap;
   if the first time interval is not contiguous with the second time interval, determining a gap is in the data;
   initiating a request for data from the meter to fill the gap in the data; and
   if the data to fill the gap is not received, transmitting the data with the gap to the customer.

2. The method of claim 1, further comprising:
   receiving, in a second transmission over the satellite communications network, data in accordance with a request for data from the meter to fill a gap in the data; and
   placing the data received from the request into the gap.

3. The method of claim 1, further comprising:
   determining whether eligible data is available to transmit to the customer, the eligible data comprises data without a processing condition;
   transmitting the eligible data to the customer if the eligible data is available; and
   formatting the eligible data in accordance with a customer preference.

4. The method of claim 1, further comprising inserting the interval data into a header table, the header table storing the interval data for transmission to the customer.

5. The method of claim 1, further comprising:
   requesting the meter data from a satellite communications device in accordance with a customer request; and
   receiving the meter data in accordance with the customer request.

6. The method of claim 1, further comprising:
    initiating a request for the meter data from a satellite communications device: and
    receiving the meter data in accordance with the initiated request.

7. A server for processing meter data into a common format, comprising:
    an application operable to receive, in a first transmission, meter data using a satellite communications network in a common protocol, the meter data representing information read at time intervals from associated utility meters in at least two data formats, each data format associated with a type of utility meter;
    a process manager coupled to the application and operable to process the meter data in the plurality of formats into a common data format; and
    a database coupled to the process manager and operable to store the meter data in the common format as interval data for transmission to a customer, wherein the application is further operable to:
        compare a first time interval of the received data to a second time interval of previously stored data from a particular meter;
        if at least a portion of the first time interval and the second time interval overlap, determine an overlap of data;
        discard a selected portion of the received data or the stored data to remove the overlap;
        if the first time interval is not contiguous with the second time interval, determine a gap is in the data;
        initiate a request for data from the meter to fill the gap in the data; and
        if the data to fill the gap is not received, transmit the data with the gap to the customer.

8. The server of claim 7, the application operable to:
    receive, in a second transmission over the satellite communications network, data in accordance with a request for data from the meter to fill a gap in the data; and
    place the data received from the request into the gap.

9. The server of claim 7, the process manager operable to:
    determine whether eligible data is available to transmit to the customer, the eligible data comprises data without a processing condition;
    transmit the eligible data to the customer if the eligible data is available; and
    format the eligible data in accordance with a customer preference.

10. The server of claim 7, the process manager operable to insert the interval data into a header table, the header table storing the interval data for transmission to the customer.

11. The server of claim 7, the application operable to:
    request the meter data from a satellite communications device in accordance with a customer request; and
    receive the meter data in accordance with the customer request.

12. The server of claim 7, the application operable to:
    initiate a request for the meter data from a satellite communications device; and
    receive the meter data in accordance with the initiated request.

13. A method for processing meter data into a common format, comprising:
    receiving, in a first transmission, meter data using a satellite communications network in a common protocol, the meter data representing information read at time intervals from associated utility meters in at least two data formats, each data format associated with a type of utility meter;
    comparing a first time interval of the received data to a second time interval of previously stored data from a particular meter;
    if at least a portion of the first time interval and the second time interval overlap, determining an overlap of data;
    discarding a selected portion of the received data or the stored data to remove the overlap;
    if the first time interval is not contiguous with the second time interval, determining a gap is in the data;
    initiating a request for the data from the meter to fill the gap in the data;
    if the data to fill the gap is available, receiving, in a second transmission over the satellite communications network, data in accordance with a request for data from the meter to fill the gap in the data;
    placing the data received from the request into the gap;
    processing the meter data in the plurality of formats into a common data format;
    storing the meter data in the common format as interval data for transmission to a customer;
    inserting the interval data into a header table, the header table storing the interval data for transmission to the customer;
    determining whether eligible data is available to transmit to the customer, the eligible data comprises data without a processing condition;
    transmitting the eligible data to the customer if the eligible data is available;
    formatting the eligible data in accordance with a customer preference; and
    if the data to fill the gap is not received, transmitting the data with the gap to the customer.

* * * * *